US008543983B2

(12) United States Patent
Murthy

(10) Patent No.: US 8,543,983 B2
(45) Date of Patent: Sep. 24, 2013

(54) CREATING HIERARCHICAL MESSAGE SEQUENCE CHARTS FOR VISUALIZING USER-INTERACTIVE APPLICATIONS

(75) Inventor: Praveen K. Murthy, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 618 days.

(21) Appl. No.: 12/816,124

(22) Filed: Jun. 15, 2010

(65) Prior Publication Data

US 2011/0307867 A1 Dec. 15, 2011

(51) Int. Cl.
*G06F 9/44* (2006.01)
(52) U.S. Cl.
USPC ............ 717/125; 717/127; 717/134; 717/135
(58) Field of Classification Search
USPC .................................. 717/125, 134, 135, 127
See application file for complete search history.

(56) References Cited

U.S. PATENT DOCUMENTS

| 5,398,022 | A  | * | 3/1995 | Lipp ............................. 340/7.52 |
| 6,415,396 | B1 | * | 7/2002 | Singh et al. ................. 714/38.13 |
| 6,516,306 | B1 | * | 2/2003 | Alur et al. ........................ 706/10 |
| 7,275,231 | B2 |   | 9/2007 | Murthy et al. |
| 8,365,112 | B2 | * | 1/2013 | Oishi et al. .................... 716/106 |

OTHER PUBLICATIONS

Chatley et al. "Model-based Simulation of Web Applications for Usability Assessment", 2003.*
Amyot et al. "UCM-Driven Testing of Web Applications", 2005.*
Jens Grabowski "Test Case Generation and Test Case Specification with Message Sequence Charts", 1994.*
Wang et al, "TTCN-3 Based Conformance Testing of Mobile Broadcast Business Management System in 3G Networks", 2009.*
Michael Schmitt, "Automatic Test Generation Based on Formal Specifications", 2003.*
Ali Mesbah et al., "*Crawling AJAX by Inferring User Interface State Changes*", Delft University of Technology Solftware Engineering Research Group Technical Report Series, 2008.
Harold Thimbleby, "*The Directed Chinese Postman Problem*", UCLIC, University College London Interaction Centre, Software-Practice and Experience, Published Online Aug. 6, 2003.
Purandar Bhaduri et al., "*Formal Techniques for Analysing Scenarios Using Message Sequence Charts*", Electronic Notes in Theoretical Computer Science 65 No. 7, http://www.elsevier.nl/locate/entcs/volume65.html, 2002.
FSP Language Specification—V3.0 Animation Add on, Graphical Animation.
ITU-T Telecommunication Standardization Sector of ITU, "*Message Sequence Chart (MSC)*", International Telecommunication Union, Z.120 (Oct. 1996).

(Continued)

*Primary Examiner* — Phillip H Nguyen
(74) *Attorney, Agent, or Firm* — Baker Botts L.L.P.

(57) ABSTRACT

In one embodiment, access use information associated with a user-interactive software application, the use information identifies one or more transitions between specific ones of one or more displayable views of the software application and one or more corresponding user actions that cause the transitions; and construct a hierarchical message sequence chart (hMSC) comprising one or more basic message sequence chars (bMSCs) and one or more edges linking specific ones of the bMSCs to represent the use information, comprising: represent the views and the user actions with respect to the views identified in the use information with the bMSCs; represent the transitions and the user actions that cause the transitions identified in the use information with the edges; and for each one of the transitions identified in the use information, link the bMSCs representing the views associated with the transition with the edge representing the transition.

25 Claims, 5 Drawing Sheets

(56) References Cited

OTHER PUBLICATIONS

Werner Damm et al., *"LSCs: Breathing Life Into Message Sequence Charts"*, Formal Methods in System Design, 19, 45-80, 2001.

"LTSA-Labelled Transition System Analyer", http://www.doc.ic.ac.uk/ltsa/, downloaded Jan. 6, 2011.

"OMG Unified Modeling Language Specification", Version 1.3, Mar. 2000.

Doron A. Peled, "Software Reliability Methods", Springer-Verlag New York, 2001.

* cited by examiner

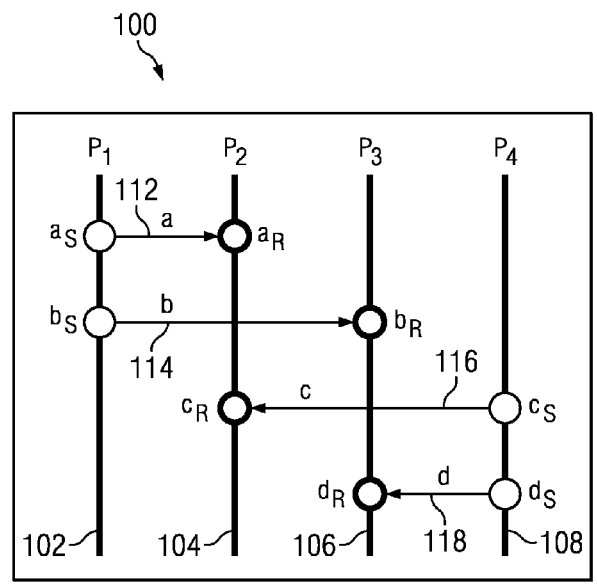
FIG. 1
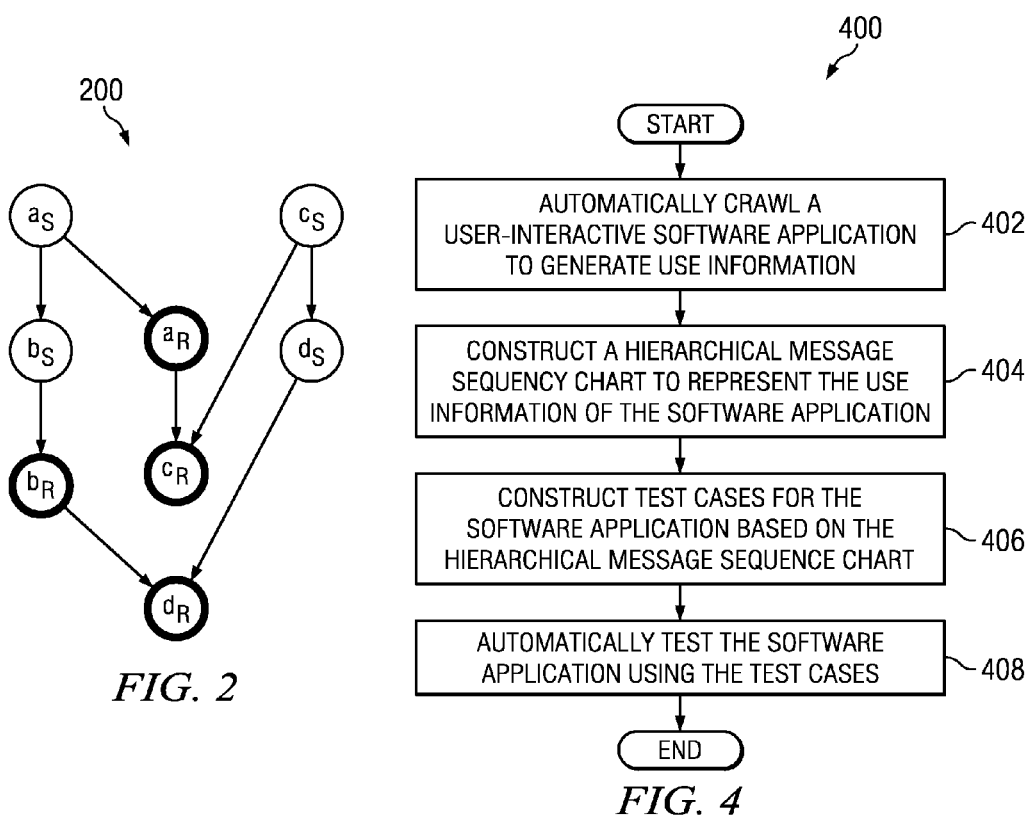
FIG. 2
FIG. 4

CREATING HIERARCHICAL MESSAGE SEQUENCE CHARTS FOR VISUALIZING USER-INTERACTIVE APPLICATIONS

TECHNICAL FIELD

The present disclosure relates to user-interactive software applications.

BACKGROUND

There are multiple types of software applications, one of which is user-interactive software applications. A user-interactive software application may be either a desktop-based application that may be executed on a standalone computing system or a network-based application that may be executed on a client or a server within a client-server environment. With a user-interactive software application, typically, there are multiple displayable views that may be displayed to a user of the application one at a time on, for example, the display screen of the computing system or client device on which the application is executed. These displayable views are the output of the application. The application may accept various types of input from the user in connection with specific views that are currently displayed to the user through, for example, a human-input device such as a mouse, a keyboard, or a joystick. The user may provide different types of input through different views of the application.

Sometimes, based on the design logic or specification of the user-interactive software application, while the application is executed, a particular user input may cause the view being displayed to the user to change. For example, the user clicking the mouse on a specific area within the view that is currently displayed to the user may result in another view to be displayed to the user, replacing the previous view. In other words, the application displays different views in response to different user input. The output of the application is controlled by and changes depending on the specific user input. Hence, the application is user-interactive.

BRIEF DESCRIPTION OF THE DRAWINGS

FIG. 1 illustrates an example basic message sequence chart.

FIG. 2 illustrates an example graphic that represents the partial ordering of the message events among the processes illustrated in FIG. 1.

FIG. 4 illustrates an example method for representing the use information of a user-interactive software application using a hierarchical message sequence chart.

DESCRIPTION OF EXAMPLE EMBODIMENTS

Figure 3A:
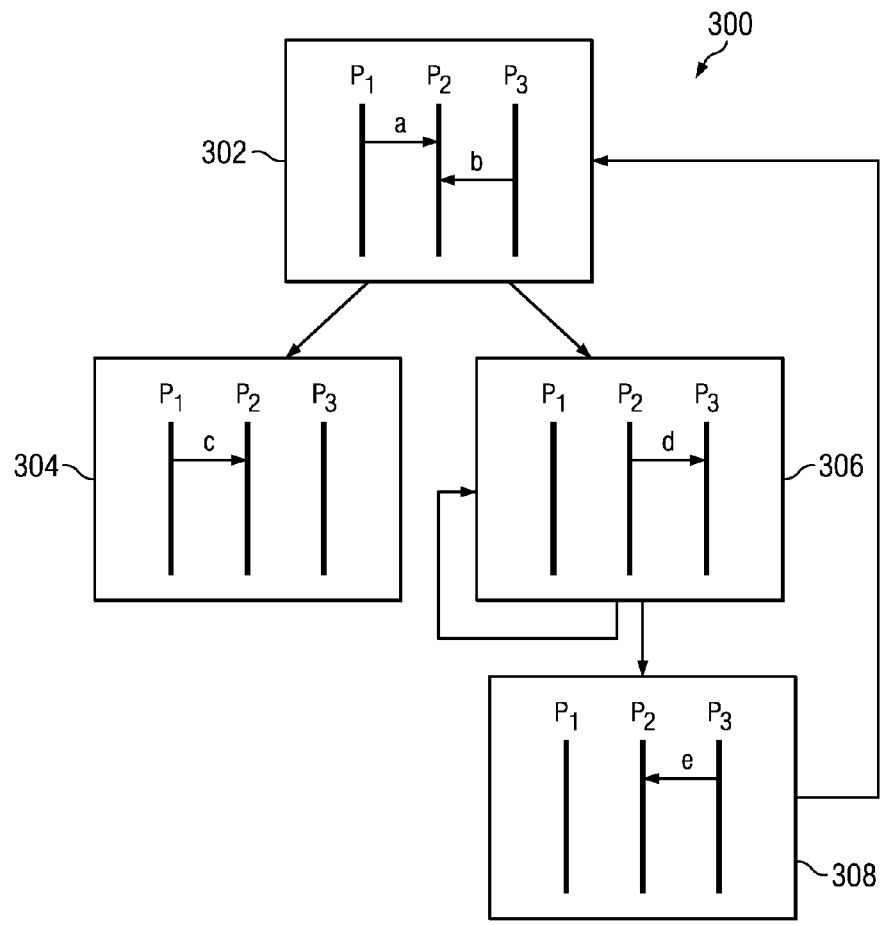
FIG. 3A illustrates an example hierarchical message sequence chart.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In particular embodiments, the output of a user-interactive software application may include multiple displayable views that may be displayed to a user of the application one at a time. A user action with respect to a view that is currently displayed to the user may provide a user input to the application and cause the application to display another view to the user in response. The design logic or specification of the application may dictate which view should be displayed to the user in response to which specific user input. In particular embodiments, a transition between two different views may occur when a user input in connection with the first one of the two views, which is currently displayed to the user, causes the application to display the second one of the two views to the user, replacing the first view. In particular embodiments, a transition may also occur between the same view, in which case a user input in connection with the view, which is currently displayed to the user, causes the application to display the same view to the user again. In this case, the user input essentially causes no change to the output of the application.

In particular embodiments, the use information associated with a user-interactive software application may include any number of transitions between specific views of the application and the corresponding user actions that may cause these transitions. In particular embodiments, the user actions may be originated from and associated with any number of users. In particular embodiments, the use information may be represented using a hierarchical message sequence chart (hMSC) that includes any number of basic message sequence charts (bMSCs) and directed edges, with each bMSC representing a view of the application and each directed edge representing a transition between the specific views and the direction of the edge indicating the direction of the transition. That is, a directed edge links two bMSCs in the hMSC if there is a corresponding transition between the two views represented by the two bMSCs in the use information. In particular embodiments, each directed edge may also be associated with the corresponding user action that causes the transition.

A message sequence chart (MSC) is a standardized interaction diagram. It is a specific type of specification and description language (SDL) and is suitable for depicting communication behavior in real-time systems. MSCs may have different levels of complexity.

FIG. 1 illustrates an example basic message sequence chart (bMSC) 100. In particular embodiments, a bMSC may include any number of vertical bars. In particular embodiments, each vertical bar represents a specific process, and there may be any number of vertical bars in a bMSC representing any number of processes within a system. For example, bMSC 100 includes four vertical bars 102, 104, 106, and 108 representing four different processes $P_1$, $P_2$, $P_3$, and $P_4$. Each process may communicate with other processes by sending messages to the other processes. If a process sends a message to another process, in particular embodiments, the message may be represented in a bMSC by a directed horizontal line linking the message-sending process and the message-receiving process, and the direction of the horizontal line indicates the direction of the message. For example, bMSC 100 includes four directed horizontal lines 112, 114, 116, and 118 representing four messages a, b, c, and d. More specifically, message a is sent from process $P_1$ to process $P_2$; message b is sent from process $P_1$ to process $P_3$; message c is sent from process $P_4$ to process $P_2$; and message d is sent from process $P_4$ to process $P_3$. In particular embodiments, for each message sent between two processes, the sending and receiving processes may be further visually distinguished in a bMSC with different markings. For example, in bMSC 100, for each of messages a, b, c, and d, the sending process of the message is indicated with a thin circle attached to one end of the horizontal line representing the message and the receiving process of the message is indicated with a thick circle attached to the other end of the horizontal line representing the message. Of course, other types of markings may also be used.

In particular embodiments, a bMSC also indicates a partial ordering, in terms of time, of the message events, including the sending and the receiving of the individual messages, among the processes. In particular embodiments, for each message sent between two processes, the sending of the message occurs before the receiving of the message. In particular embodiments, for each process, for any two message events along the vertical bar representing the process, the message event on the top occurs before the message event on the bottom along the vertical bar. For example, in bMSC 100, with message a, the sending of message a, represented by $a_S$, occurs before the receiving of message a, represented by $a_R$. Similarly, with message b, the sending of message b, represented by $b_S$, occurs before the receiving of message b, represented by $b_R$; with message c, the sending of message c, represented by $c_S$, occurs before the receiving of message c, represented by $c_R$; and with message d, the sending of message d, represented by $d_S$, occurs before the receiving of message d, represented by $d_R$. In addition, along vertical bar 102 that represents process $P_1$, there are two message events, the sending of message a, represented by $a_S$, and the sending of message b, represented by $b_S$. Thus, for process $P_1$, the sending of message a occurs before the sending of message b because $a_S$ is above $b_S$ along vertical bar 102, which represents $P_1$. Similarly, along vertical bar 104 that represents process $P_2$, there are two message events, the receiving of message a, represented by $a_R$, and the receiving of message c, represented by $c_R$. For process $P_2$, the receiving of message a occurs before the receiving of message c because $a_R$ is above $c_R$ along vertical bar 104, which represents $P_2$. Along vertical bar 106 that represents process $P_3$, there are two message events, the receiving of message b, represented by $b_R$, and the receiving of message d, represented by $d_R$. For process $P_3$, the receiving of message b occurs before the receiving of message d because $b_R$ is above $d_R$ along vertical bar 106, which represents $P_3$. And along vertical bar 108 that represents process $P_4$, there are two message events, the sending of message c, represented by $c_S$, and the sending of message d, represented by $d_S$. For process $P_4$, the sending of message c occurs before the sending of message d because $c_S$ is above $d_S$ along vertical bar 108, which represents $P_4$.

A bMSC only indicates a partial ordering of the message events among the processes because between two message events associated with two different messages and two different processes, there is no indication which one of the two message events occurs first and which one occurs second. For example, in bMSC 100, the sending of message b and the receiving of message a are two message events associated with two messages, a and b, and two processes, $P_1$ and $P_2$. The receiving of message a is an event associated with process $P_2$, because process $P_2$ is the receiving process of message a. The sending of message b is an event associated with process $P_1$, because process $P_1$ is the sending process of message b. There is no indication in bMSC 100 as to whether the sending of message b or the receiving of message a occurs first.

In particular embodiments, the partial ordering of the message events indicated by a bMSC may be represented by a graph having a number of nodes and a number of directed edges linking specific ones of the nodes, such as graph 200 illustrated in FIG. 2. In particular embodiments, each node of the graph represents one of the message events in the bMSC. For example, there are eight message events in bMSC 100, $a_S$ and $a_R$ associated with message a and processes $P_1$ and $P_2$, $b_S$ and $b_R$ associated with message b and processes $P_1$ and $P_3$, $c_S$ and $c_R$ associated with message c and processes $P_4$ and $P_2$, and $d_S$ and $d_R$ associated with message d and processes $P_4$ and $P_3$. Thus, there are eight nodes in graph 200 corresponding to message events $a_S$, $a_R$, $b_S$, $b_R$, $c_S$, $c_R$, $d_S$, and $d_R$. Between any two message events, if it is known from bMSC 100 that one event occurs before the other event, then in graph 200, a directed edge links the node representing the event that occurs first to the node representing the event that occurs second. For example, from bMSC 100, it is known that $a_S$ occurs before $a_R$; thus, in graph 200, a directed edge links the node representing $a_S$ to the node representing $a_R$. Similarly, from bMSC 100, it is known that $a_S$ occurs before $b_S$; thus, in graph 200, a directed edge links the node representing $a_S$ to the node representing $b_S$.

Some MSCs may be more complex. FIG. 3A illustrates an example hierarchical message sequence chart (hMSC) 300. In particular embodiments, a hMSC may include any number of bMSCs, with each bMSC representing a different state of a system. For example, hMSC 300 includes four bMSCs 302, 304, 306, and 308 representing four different states of a system that has three processes $P_1$, $P_2$, and $P_3$. At state 302, process $P_1$ sends message a to process $P_2$, and process $P_3$ sends message b to process $P_2$. At state 304, process $P_1$ sends message c to process $P_2$. At state 306, process $P_2$ sends message d to process $P_3$. At state 308, process $P_3$ sends message e to process $P_2$.

In particular embodiments, a message sent between two processes at one state may cause the system to transit from that state to another state. For example, with hMSC 300, at state 302 there are two messages, a and b, transmitted between the three processes. The transmission of message a may cause the system to transit from state 302 to state 304, and the transmission of message b may cause the system to transit from state 302 to state 306. In particular embodiments, a message sent between two processes may at one state may cause the system to transit from that state back to the same state itself, thus forming a loop. For example, with hMSC 300, at state 306 there is one message, d, transmitted between the processes. The transmission of message d may cause the system to loop around state 306, and this loop may occur any number of times. In addition, sometimes, a message sent between two processes at one state may cause the system to transit from that state back to an earlier state that the system has been. For example, with hMSC 300, at state 308 there is one message, e, transmitted between the processes. The transmission of message e may cause the system to transit from state 308 back to state 302.

In particular embodiments, a hMSC may include any number of directed edges linking specific bMSCs, with each directed edge representing a different transition and the direction of the edge indicating the direction of the transition. In particular embodiments, a directed edge of the hMSC either links two bMSCs representing two different states between which the transition represented by the directed edge occurs or a bMSC back to itself if the transition represented by the directed edge is a loop leading from a state back to itself. In particular embodiments, a transition may be either deterministic or non-deterministic. A deterministic transition is one that occurs as a result of or in response to an event occurring, such as the transmission of a message. A non-deterministic transition may occur not in response to any specific event occurring or without any event occurring.

Figure 3B:
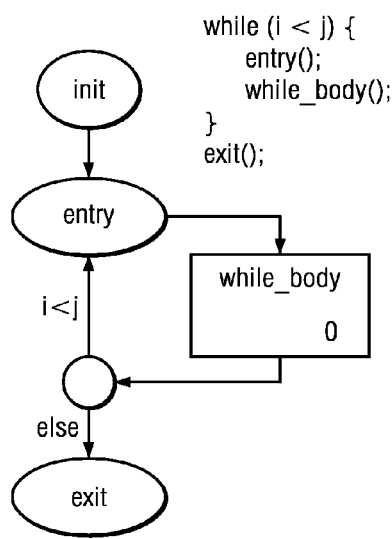
FIG. 3B illustrates a portion of an example guarded hierarchical message sequence chart that models a "while" loop.
Figure 3C:
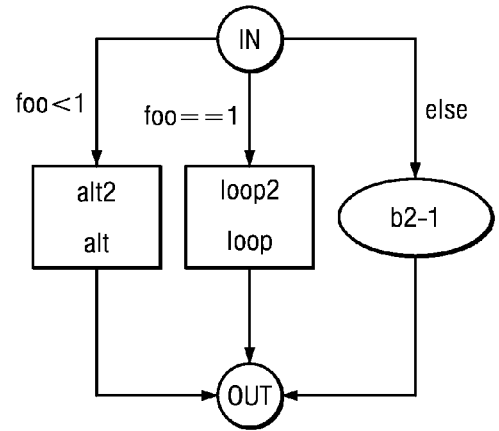
FIG. 3C illustrates a portion of an example guarded hierarchical message sequence chart that models an "if-then-else" loop.

In addition, in particular embodiments, there may be guards placed on a transition linking two bMSCs. In many practical systems, there may be times when one or more conditions must be met before an event may occur (e.g., for a message to be sent from one process to another process, or for a system to transit from one state to another state). Thus, when modeling process interactions or system transitions using, for example, a hMSC, such as the one illustrated in FIG. 3A, conditional constructs such as guards and loops may be utilized throughout the hMSC to control the flow of the system. In particular embodiments, the edges in a hMSC, which represent specific transitions, may be specified with provisional or mandatory guards, corresponding to possible and necessary conditions, respectively. More particularly, if a provisional guard holds (i.e., is true) during an execution, control passes to a process immediately after the guard, and if it is false, the context in which this condition occurs is exited and execution may continue. By way of example, provisional guards may be used to program branches and "if-then-else" constructs. In particular embodiments, hMSCs may also enable bounded and unbounded loops, which, when combined with provisional guards, may be used to construct "while" loops and "repeat-until" loops. In contrast, a mandatory guard condition must always be true. If an execution reaches a mandatory guard that evaluates to false, this is a violation of the requirements of the system being modeled. To further illustrate, FIG. 3B illustrates a portion of an example guarded hMSC that models a "while" loop. FIG. 3C illustrates a portion of an example guarded hMSC that models an "if-then-else" loop. A "case" statement may be similarly modeled.

Figure 5:
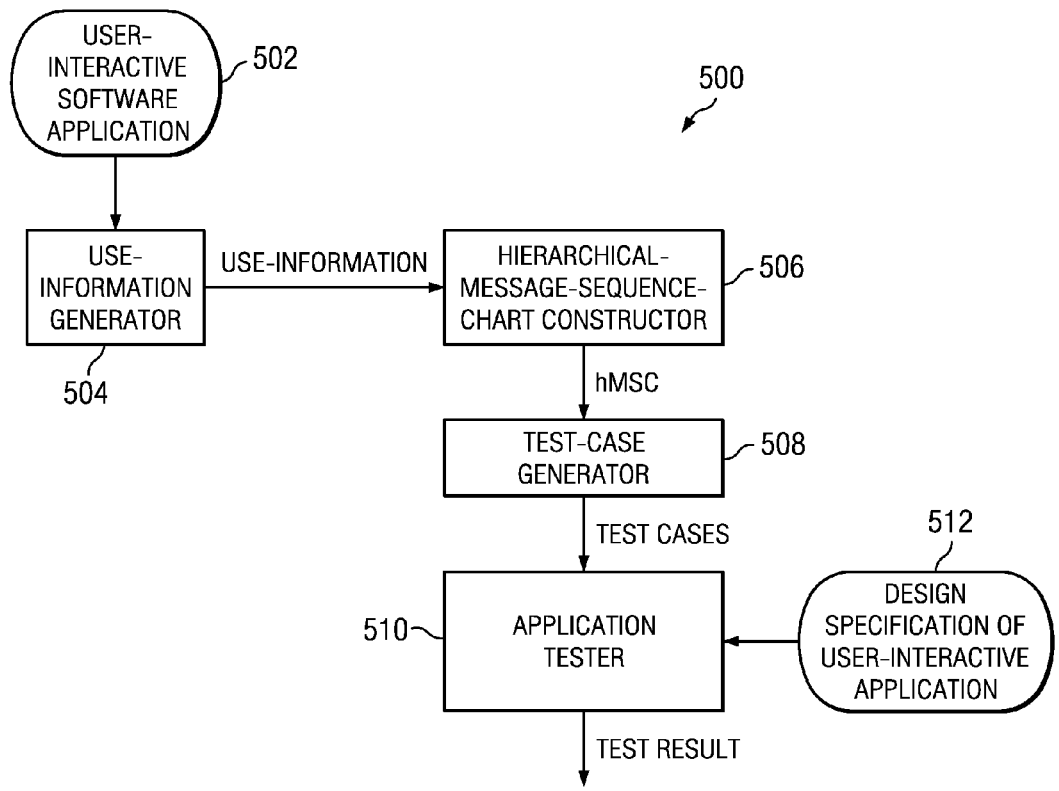
FIG. 5 illustrates an example system for representing the use information of a user-interactive software application using a hierarchical message sequence chart.

In particular embodiments, a hMSC may be used to represent the use information of a user-interactive software application. FIG. 4 illustrates an example method for representing the use information of a user-interactive software application using a hMSC. FIG. 5 illustrates an example system 500 for representing the use information of a user-interactive software application using a hMSC. FIGS. 4 and 5 are described in connection with each other.

In particular embodiments, a user-interactive software application may include any number of displayable views. During the execution of the application, different types of user input may cause the application to transit between specific views. For example, suppose the application currently displays a first view. A user of the application may provide an input to the application through the first view by performing an action with respect to the first view, which causes the application to display a second view in response. In this case, a transition occurs between the first view and the second view as a result of the user input. Sometimes, a user input may not cause any change to the output of the application. For example, again suppose the application currently displays the first view. A user of the application may provide another input to the application through the first view by performing another action with respect to the first view. However, this specific user input may not have any effect on the output of the application and the application still displays the first view unchanged after receiving the user input. In this case, the user input may be considered to cause a transition from the first view back to the first view itself, forming a loop.

There are many types of user-interactive software applications, including both desktop-based and network-based applications. A web application is a typical example of the user-interactive software application. A web application may include any number of web pages, and these web pages may be displayed in a web browser executed on a computing device. Sometimes, a web page may have multiple sets of content and different sets of content may be displayed in the web browser at different times or under different circumstances. In this case, each set of content of each web page that may be displayed in a web browser may be considered a displayable view of the web application. When a set of content of a web page is displayed to a user (e.g., in the form of a rendered web page), the user may provide an input through the displayed web page that causes a different set of content of the same web page or a set of content of a different web page to be rendered and displayed. In either case, a transition occurs between two sets of content; that is, a transition occurs between two views of the web application in response to the user input. In particular embodiments, a transition that occurs between two different sets of content of the same web page is referred to as an intra-page transition, and a transition that occurs between two sets of content of two different web pages is referred to as an inter-page transition. For example, a web page often includes a number of clickable links. By clicking on such a link using a human-input device, such as a mouse, another web page, referenced by the link, is displayed in the web browser, replacing the previous web page. In this case, the user action—the clicking of a link—results in a user input to the web application that causes a transition between the two web pages. As another example, a user may log into an online account by providing a username and a password through a login web page. If the user provides the correct combination of username and password, another web page displaying the user's account information may be displayed. On the other hand, if the user provides an incorrect combination of username and password, an error message may appear in the same login page asking the user to re-enter the username and the password. In this case, the user action—typing the username and the password—may cause a transition either between two web pages or between two sets of content of the same web page.

Figure 6:
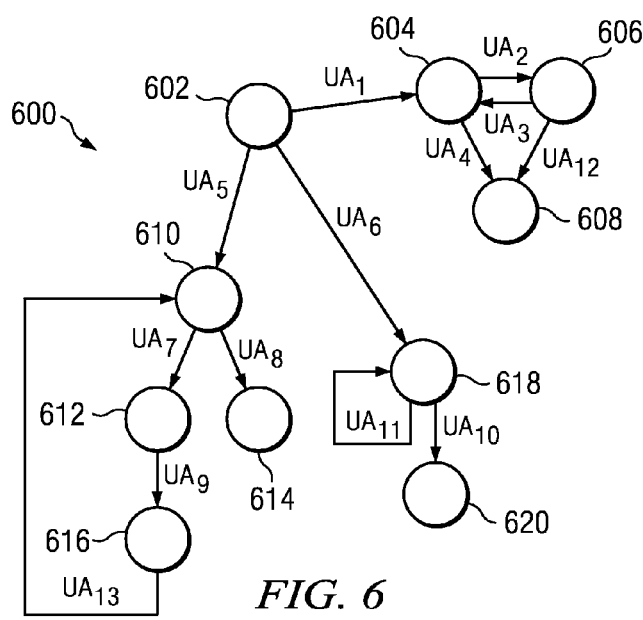
FIG. 6 illustrates an example graph that visually depicting the use information of a user-interactive software application.

In particular embodiments, the use information associated with a user-interactive software application may include any number of transitions between specific views of the application and the corresponding user actions that may cause these transitions, and the user actions may originate from any number of users. The use information associated with a user-interactive software application may be depicted graphically. FIG. 6 illustrates an example graph 600 that depict an example use information. Graph 600 includes ten nodes 602-620 with each node representing a different view of the application. Each transition between two views is represented by a directed edge linking the two nodes representing the two views, and the direction of the edge indicates the direction of the transition. For example, with graph 600, there is a directed edge linking nodes 602 and 610, indicating a transition from the view represented by node 602 to the view represented by node 610. The directed edge may be marked with the particular user action that causes the transition (e.g., $UA_5$ is attached to the directed edge linking nodes 602 and 610, indicating that the user action that causes this particular transition is $UA_5$). Sometimes, a user action may cause a transition from a view to loop back to itself. For example, with graph 600, there is a directed edge that both starts and ends with node 618, and the user action that causes this particular transition is $UA_{11}$.

The use information associated with a user-interactive software application may be generated manually (e.g., by a human user) or automatically (e.g., by another computer program), and the present disclosure contemplates any suitable means to generate the use information for a user-interactive software application. Particular embodiments may automatically analyze a user-interactive software application to generate the use information associated with the application, as illustrated in step 402 of FIG. 4. In particular embodiments, step 402 may be performed by a use-information generator 504 illustrated in FIG. 5. In particular embodiments, use-information generator 504 may take a user-interactive software application 502 as input, analyze user-interactive software application 502, and output the use information associated with user-interactive software application 502. For example, if user-interactive software application 502 is a web application, then use-information generator 504 may be implemented as a web crawler that automatically browses the web pages of the web application in a methodical manner. The web crawler may simulate different user actions in connection with specific web pages and record the individual view transitions caused by these user actions.

Particular embodiments may represent the use information generated for the user-interactive software application using a hMSC, as illustrated in step 404 of FIG. 4. In particular embodiments, step 404 may be performed by a hMSC constructor 506 illustrated in FIG. 5. In particular embodiments, hMSC constructor 506 may take as input the use information generated by use-information generator 504 and output a hMSC that represents the use information.

Figure 7:
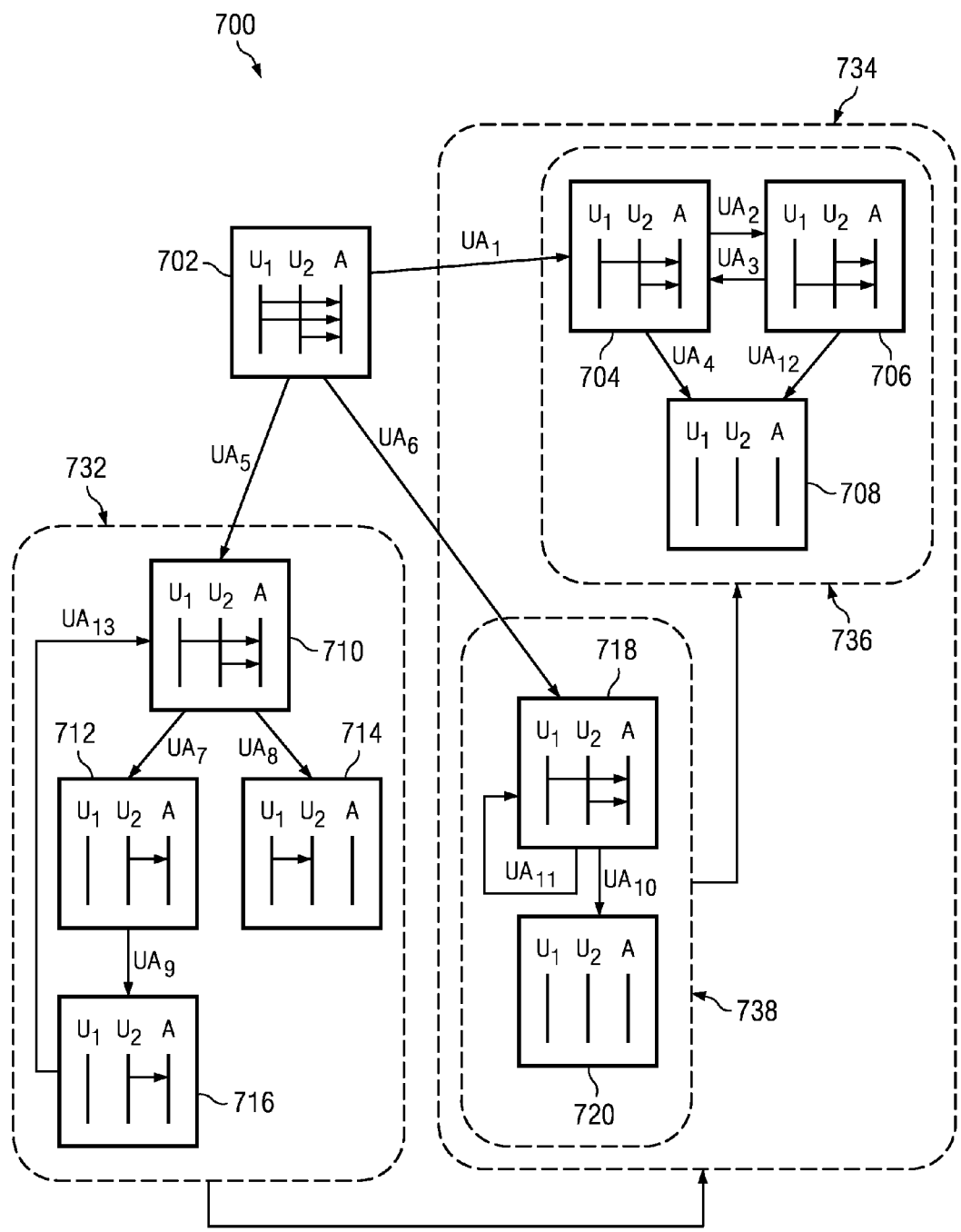
FIG. 7 illustrates an example hierarchical message sequence chart that represents the use information as depicted in FIG. 6.

FIG. 7 illustrates an example hMSC 700 that represents the use information as depicted in FIG. 6. In particular embodiments, a hMSC that represents the use information associated with a user-interactive software application may include any number of bMSCs and directed edges linking specific bMSCs. For example, hMSC 700 includes ten bMSCs 702-720. Each view of the application, as represented by a node of graph 600, is represented by a bMSC of hMSC 700. For example, bMSC 702 of hMSC 700 corresponds to node 602 of graph 600. In particular embodiments, each bMSC of a hMSC may include any number of vertical bars, which are similar to vertical bars 102, 104, 106, and 108 representing the processes as illustrated in FIG. 1, that represent the user-interactive software application and any number of users that use the application and provide the user actions that cause the view transitions. The number of vertical bars in each bMSC may vary depending on the number of users that provide the user actions in the use information. For example, with hMSC 700, the user actions in the use information originate from two users, $U_1$ and $U_2$, of the application, A. Thus, in each bMSC 702-720, there are three vertical bars, one representing the application, A, and two representing the two users, $U_1$ and $U_1$, respectively.

In particular embodiments, with each bMSC of a hMSC, the user actions occurred in connection with the view represented by the bMSC are represented by directed horizontal lines linking the users providing the user actions and the application. These horizontal lines are similar to the ones representing the messages as illustrated in FIG. 1 (e.g., horizontal lines 112, 114, 116, and 118). For example, in bMSC 702, there are three possible user actions, $UA_1$, $UA_2$, and $UA_3$, in connection with the corresponding view, two originated from user $U_1$ and one originated from user $U_2$. The three possible user actions cause three possible view transitions from the view represented by bMSC 702. First, user action $UA_1$ causes a transition from the view represented by bMSC 702 to the view represented by bMSC 704. Second, user action $UA_6$ causes a transition from the view represented by bMSC 702 to the view represented by bMSC 718. And third, user action $UA_5$ causes a transition from the view represented by bMSC 702 to the view represented by bMSC 710. Thus, there are three directed edges in hMSC 700 linking bMSC 702 with bMSCs 704, 718, and 710 respectively, with each edge representing one of the possible transitions from the view represented by bMSC 702 and the direction of the edge indicating the direction of the transition. A comparison of FIGS. 6 and 7 illustrates that for every directed edge in graph 600 that represents a view transition, there is a corresponding directed edge in hMSC 700 that represents the same view transition.

In this manner, all the transitions between specific views in the use information may be represented by the directed edges of a hMSC (e.g., hMSC 700). To summarize, in particular embodiments, a hMSC may include any number of bMSCs and directed edges linking specific bMSCs. Each bMSC represents a displayable view of the user-interactive software application and the user actions provided by the users in connection with the view, which result in user input to the application through the view. The processes in each bMSC correspond to the application and the users of the application, and the messages in each bMSC correspond to the user actions in connection with the view of the application represented by the bMSC. For each view transition that is caused by a particular user action, a directed edge links the bMSCs associated with the transition and the edge represents the transition and the user action that causes the transition.

In particular embodiments, individual bMSCs in a hMSC may be further grouped into multiple levels in a hierarchy based on heuristics or any other suitable types of rules. The present disclosure contemplates any suitable means of grouping hMSCs into any type of hierarchy. For example, the bMSCs may be grouped based on their functional or organizational relationship. With hMSC 700, bMSCs 710, 712, 714, and 716 are grouped together as group 732. Similarly, bMSCs 704, 706, and 708 are grouped together as group 736, and bMSCs 718 and 720 are grouped together as group 738. In addition, multiple groups of bMSCs may be further grouped together into larger, higher-level groups. For example, with hMSC 700, groups 736 and 738 may be further grouped into group 734. There may be transitions between groups of bMSCs at different levels of the hierarchy. For example, with hMSC 700, a transition may occur from group 732 to group 734, or a transition may occur from group 738 to group 736.

In particular embodiments, a hMSC, once constructed, may be displayed with a graphical representation, such as the way hMSC 700 is graphically represented in FIG. 7. A user may thus view and analyze the hMSC or specific portions of the hMSC, and apply the hMSC to practical applications. Furthermore, a user may adjust the graphical representation to view the hMSC from different perspective to gain a better understanding of the view transitions and the corresponding user actions that cause these transitions. For example, sometimes the use information may include redundant information such as redundant transitions (e.g., multiple user actions causing the same transition). By viewing a graphical representation of the hMSC, such redundant information may be detected and eliminated so that when the hMSC is used in practical applications, they do not result unnecessary work or complexity. As another example, multiple bMSCs, together with the associated user actions, may form paths that illustrate the progression of the programming logic of the user-interactive software application. In FIG. 7, at bMSC 702, user action $UA_6$ results in a view transition from the view represented by bMSC 702 to the view represented by bMSC 718; and at bMSC 718, user action $UA_{10}$ results in a view transition from the view represented by bMSC 718 to the view represented by bMSC 720. Thus, this particular path is formed by bMSCs 702, 718, and 720 and user actions $UA_6$ and $UA_{10}$. From this path, it may be inferred that it takes two user actions to transit from the view represented by bMSC 702 to the view represented by bMSC 720. If the view represented by bMSC 702 is a login page of a web application and the view represented by bMSC 720 is a checkout page of the web application, the path suggests that it takes two user actions for a user to traverse from the login page to the checkout page. Also in FIG. 7, at bMSC 718, user action $UA_{11}$ results in a view transition from the view represented by bMSC 718 back to itself, forming a loop. Thus, a path formed by bMSCs 702, 718, and 720 and user actions $UA_6$, $UA_{10}$, and $UA_{11}$ may include looping around the view represented by bMSC 718 a number of times.

There are many practical applications of the hMSCs that represent the use information associated with user-interactive software applications, one of which is to generate test cases that may be used to test the applications, as illustrated in step 406 of FIG. 4. In particular embodiments, step 406 may be performed by a test-case generator 508, as illustrated in FIG. 5, that takes as input a hMSC that represents the use information associated with a user-interactive software application and outputs a set of test cases for the application. In particular embodiments, the test cases may indicate how the application should be used, and may include specific test user actions in connection with specific views of the application and the expected or correct responses of the application (e.g., which views should be displayed in response to the test user actions). For example, suppose the application is a web application. One of the test cases may be a test user action that is a click on a link contained in a web page, and the correct response to this user action is to display the web page referenced by the clicked link. This test case may be generated based on one of the transitions represented by the hMSC. Another one of the test cases may be a test user action that provides an incorrect combination of the user's username and password to a login page, and the correct response to this user action is to display the login page again but with an additional error message asking the user to re-enter the username and the password. Again, this test case may be generated based on another one of the transitions represented by the hMSC. A third test case may be a user action that is a click on an area of a web page that does not contain any clickable links, and the correct response to this user action is not to make any change to the current output of the application and ignore the user action. This test case may be generated based on a third transition (e.g., a transition that loops around a view) represented by the hMSC.

In particular embodiments, the test cases thus generated may be used to automatically test the user-interactive software application, as illustrated in step 408 of FIG. 4. In particular embodiments, step 408 may be performed by an application tester 510, as illustrated in FIG. 5, which may take as input the test cases and the design specification of the application, test the application using the test cases and compare the test result against the specification of the application, and output the test result indicating whether the application passes the test. For example, application tester 510 may simulate the test user actions specified by the test cases and apply these test user actions to the application under test in order to trigger some actual responses from the application. Application tester 510 may then compare these actual responses from the application against the corresponding expected or correct responses specified in the test cases or the specification of the application to determine whether the application passes the test.

As a specific example, one of the typical requirements placed on a web application may be that the web application should behave the same or similarly regardless of which web browser is used to display the web pages. To validate a web application for this requirement, in particular embodiments, the use information associated with the web application may be generated using an automatic crawler while executing the web application (e.g., displaying the web pages) in a first type of web browser (e.g., Microsoft Internet Explorer). The use information may include transitions between different web pages or between different sets of content of a web page and the corresponding user actions that cause these transitions. The use information may then be represented using a hMSC, and test cases may be generated from the hMSC (e.g., by test-case generator 508 as illustrated in FIG. 5). In particular embodiments, the test cases may include test user actions in connection with specific web pages that correspond to the user actions included in the use information. To test whether the web application behave the same or similarly when executed in different web browsers, an application tester (e.g., application tester 510 as illustrated in FIG. 5) may execute the web application in a second type of web browser (e.g., Google Chrome or Mozilla Firefox) and simulate the test user actions to apply to the web application to cause the application to provide actual responses (e.g., transitions between web pages). The actual transitions that occurred in response to the test user actions may then be compared to the corresponding transitions indicated by the hMSC. If the two sets of transitions agree, then the web application passes the test because it behaves the same in the two types of web browsers.

Other example uses for the test cases may include platform compatibility testing (e.g., generating use information while executing the software application on one type of platform, constructing test cases from the hMSC that represents the use information, and testing the software on another type of platform using the test cases), version compatibility testing, equivalence testing, debugging (e.g., testing the software using the test cases and comparing the actual view transitions occurred in response to the test user actions to the specification of the software), formal software verification and validation, performance analysis (e.g., locating critical paths from the hMSC or determining the number of user actions it requires to traverse from one view, such as a login page, to another view, such as a logout or checkout page, in the hMSC).

In particular embodiments, use-information generator 504, hMSC constructor 506, test-case generator 508, and application tester 510 may each be implemented using computer software or hardware. Furthermore, some of these functionalities may be combined into the same module and some may be further divided into sub-modules.

Figure 8:
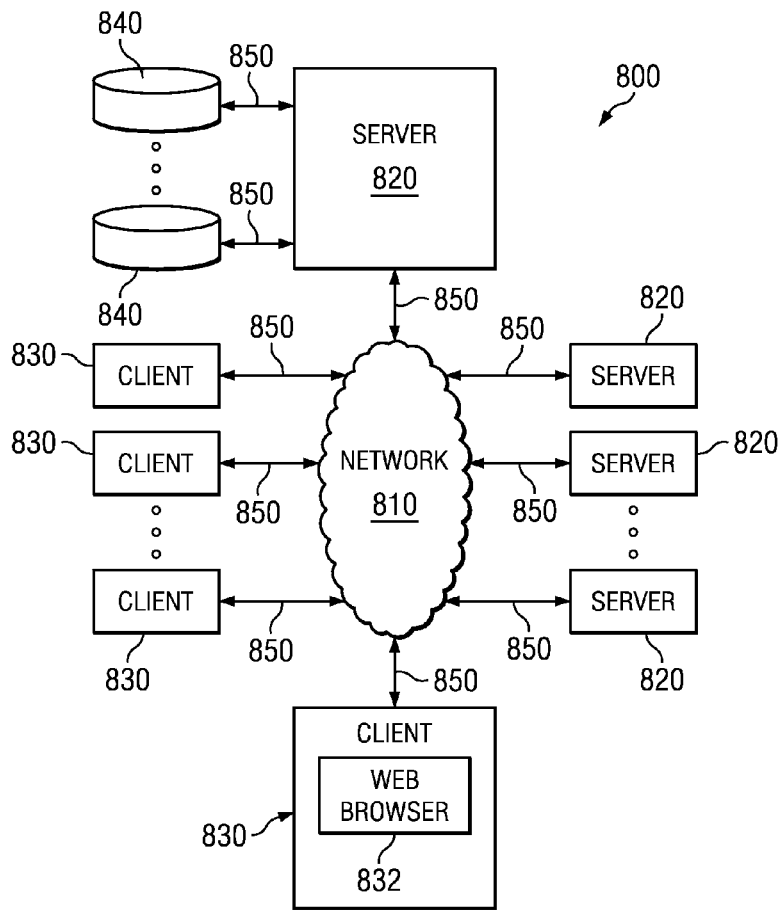
FIG. 8 illustrates an example network environment.

Particular embodiments may be implemented in a network environment. FIG. 8 illustrates an example network environment 800 suitable for providing software validation as a service. Network environment 800 includes a network 810 coupling one or more servers 820 and one or more clients 830 to each other. In particular embodiments, network 810 is an intranet, an extranet, a virtual private network (VPN), a local area network (LAN), a wireless LAN (WLAN), a wide area network (WAN), a metropolitan area network (MAN), a portion of the Internet, or another network 810 or a combination of two or more such networks 810. The present disclosure contemplates any suitable network 810.

One or more links 850 couple a server 820 or a client 830 to network 810. In particular embodiments, one or more links 850 each includes one or more wireline, wireless, or optical links 850. In particular embodiments, one or more links 850 each includes an intranet, an extranet, a VPN, a LAN, a WLAN, a WAN, a MAN, a portion of the Internet, or another link 850 or a combination of two or more such links 850. The present disclosure contemplates any suitable links 850 coupling servers 820 and clients 830 to network 810.

In particular embodiments, each server 820 may be a unitary server or may be a distributed server spanning multiple computers or multiple datacenters. Servers 820 may be of various types, such as, for example and without limitation, web server, news server, mail server, message server, advertising server, file server, application server, exchange server, database server, or proxy server. In particular embodiments, each server 820 may include hardware, software, or embedded logic components or a combination of two or more such components for carrying out the appropriate functionalities implemented or supported by server 820. For example, a web server is generally capable of hosting websites containing web pages or particular elements of web pages. More specifically, a web server may host HTML files or other file types, or may dynamically create or constitute files upon a request, and communicate them to clients 830 in response to HTTP or other requests from clients 830. A mail server is generally capable of providing electronic mail services to various clients 830. A database server is generally capable of providing an interface for managing data stored in one or more data stores.

In particular embodiments, one or more data storages 840 may be communicatively linked to one or more severs 820 via one or more links 850. In particular embodiments, data storages 840 may be used to store various types of information. In particular embodiments, the information stored in data storages 840 may be organized according to specific data structures. In particular embodiment, each data storage 840 may be a relational database. Particular embodiments may provide interfaces that enable servers 820 or clients 830 to manage, e.g., retrieve, modify, add, or delete, the information stored in data storage 840.

In particular embodiments, each client 830 may be an electronic device including hardware, software, or embedded logic components or a combination of two or more such components and capable of carrying out the appropriate functionalities implemented or supported by client 830. For example and without limitation, a client 830 may be a desktop computer system, a notebook computer system, a netbook computer system, a handheld electronic device, or a mobile telephone. The present disclosure contemplates any suitable clients 830. A client 830 may enable a network user at client 830 to access network 830. A client 830 may enable its user to communicate with other users at other clients 830.

A client 830 may have a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 830 may enter a Uniform Resource Locator (URL) or other address directing the web browser 832 to a server 820, and the web browser 832 may generate a Hyper Text Transfer Protocol (HTTP) request and communicate the HTTP request to server 820. Server 820 may accept the HTTP request and communicate to client 830 one or more Hyper Text Markup Language (HTML) files responsive to the HTTP request. Client 830 may render a web page based on the HTML files from server 820 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 9:
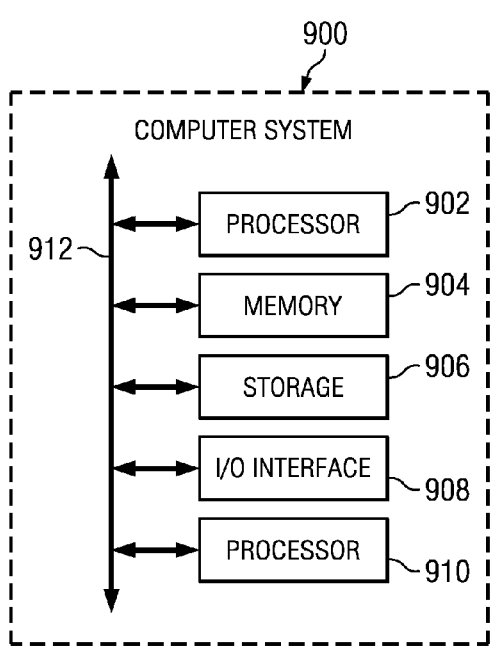
FIG. 9 illustrates an example computer system.

Particular embodiments may be implemented on one or more computer systems. FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. The present disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. The present disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computing devices:
   accessing use information associated with a user-interactive software application, wherein:
      the software application comprises one or more displayable views;
      during execution of the software application, a transition from a first one of the views to a second one of the views is caused by a user action with respect to the first one of the views; and
      the use information identifies one or more transitions between specific ones of the views and one or more corresponding user actions that cause the transitions; and
   constructing a hierarchical message sequence chart comprising one or more basic message sequence charts and one or more edges linking specific ones of the basic message sequence charts to represent the use information, comprising:
      representing the views and the user actions with respect to the views identified in the use information with the basic message sequence charts of the hierarchical message sequence chart;
      representing the transitions and the user actions that cause the transitions identified in the use information with the edges of the hierarchical message sequence chart; and
      for each one of the transitions identified in the use information, linking the basic message sequence charts representing the views associated with the transition with the edge representing the transition.

2. The method of claim 1, wherein constructing the hierarchical message sequence chart further comprises grouping the basic message sequence charts into one or more groups at one or more hierarchical levels based on heuristics.

3. The method of claim 1, further comprising:
   constructing one or more test cases for the software application based on the hierarchical message sequence chart, wherein each one of the test cases comprises a test user action with respect to one of the views of the software application and an expected response to the test user action from the software application; and automatically testing the software application using the test cases, comprising, for each one of the test cases:
  simulating the test user action of the test case to the software application to generate an actual response from the software application; and
  comparing the actual response with the expected response of the test case.

4. The method of claim 1, further comprising displaying a graphical representation of the hierarchical message sequence chart.

5. The method of claim 1, wherein:
the software application is a web application comprising one or more web pages and each one of the web pages has one or more sets of content;
each one of the views of the software application is one of the sets of content of one of the web pages; and
the transition from the first one of the views to the second one of the views is a transition from a first one of the sets of content of a first one of the web pages to a second one of the sets of content of the first one of the web pages or from the first one of the sets of content of the first one of the web pages to a first one of the sets of content of a second one of the web pages.

6. The method of claim 5, further comprising automatically crawling a website hosting the web application to obtain the use information associated with the web application.

7. The method of claim 6, wherein, when crawling the website hosting the web application, the web application is executed in a first browser.

8. The method of claim 7, further comprising validating the web application with a second browser, comprising:
constructing one or more test cases for the web application based on the hierarchical message sequence chart, wherein each one of the test cases comprises a test user action with respect to one of the states of one of the web pages; and
automatically testing the web application with the second browser using the test cases, comprising:
  applying the test cases to the web application while executing the web application in the second browser; and
  comparing one or more responses to the test user actions from the web application while executed in the second browser with one or more corresponding responses to the test user actions from the web application while executed in the first browser.

9. A system comprising:
a memory comprising instructions executable by one or more processors; and
one or more processors coupled to the memory and operable to execute the instructions, the one or more processors being operable when executing the instructions to:
  access use information associated with a user-interactive software application, wherein:
    the software application comprises one or more displayable views;
    during execution of the software application, a transition from a first one of the views to a second one of the views is caused by a user action with respect to the first one of the views; and
    the use information identifies one or more transitions between specific ones of the views and one or more corresponding user actions that cause the transitions; and
  construct a hierarchical message sequence chart comprising one or more basic message sequence charts and one or more edges linking specific ones of the basic message sequence charts to represent the use information, comprising:
    represent the views and the user actions with respect to the views identified in the use information with the basic message sequence charts of the hierarchical message sequence chart;
    represent the transitions and the user actions that cause the transitions identified in the use information with the edges of the hierarchical message sequence chart; and
    for each one of the transitions identified in the use information, link the basic message sequence charts representing the views associated with the transition with the edge representing the transition.

10. The system of claim 9, wherein construct the hierarchical message sequence chart further comprises group the basic message sequence charts into one or more groups at one or more hierarchical levels based on heuristics.

11. The system of claim 9, wherein the processors are further operable when executing the instructions to:
construct one or more test cases for the software application based on the hierarchical message sequence chart, wherein each one of the test cases comprises a test user action with respect to one of the views of the software application and an expected response to the test user action from the software application; and
automatically test the software application using the test cases, comprising, for each one of the test cases:
  simulate the test user action of the test case to the software application to generate an actual response from the software application; and
  compare the actual response with the expected response of the test case.

12. The system of claim 9, wherein the processors are further operable when executing the instructions to display a graphical representation of the hierarchical message sequence chart.

13. The system of claim 9, wherein:
the software application is a web application comprising one or more web pages and each one of the web pages has one or more sets of content;
each one of the views of the software application is one of the sets of content of one of the web pages; and
the transition from the first one of the views to the second one of the views is a transition from a first one of the sets of content of a first one of the web pages to a second one of the sets of content of the first one of the web pages or from the first one of the sets of content of the first one of the web pages to a first one of the sets of content of a second one of the web pages.

14. The system of claim 13, wherein the processors are further operable when executing the instructions to automatically crawl a website hosting the web application to obtain the use information associated with the web application.

15. The system of claim 14, wherein, when crawling the website hosting the web application, the web application is executed in a first browser.

16. The system of claim 15, wherein the processors are further operable when executing the instructions to validate the web application with a second browser, comprising:
construct one or more test cases for the web application based on the hierarchical message sequence chart, wherein each one of the test cases comprises a test user action with respect to one of the states of one of the web pages; and automatically test the web application with the second browser using the test cases, comprising:
apply the test cases to the web application while executing the web application in the second browser; and
compare one or more responses to the test user actions from the web application while executed in the second browser with one or more corresponding responses to the test user actions from the web application while executed in the first browser.

17. One or more computer-readable non-transitory storage media embodying software operable when executed by one or more computing devices to:
access use information associated with a user-interactive software application, wherein:
the software application comprises one or more displayable views;
during execution of the software application, a transition from a first one of the views to a second one of the views is caused by a user action with respect to the first one of the views; and
the use information identifies one or more transitions between specific ones of the views and one or more corresponding user actions that cause the transitions; and
construct a hierarchical message sequence chart comprising one or more basic message sequence charts and one or more edges linking specific ones of the basic message sequence charts to represent the use information, comprising:
represent the views and the user actions with respect to the views identified in the use information with the basic message sequence charts of the hierarchical message sequence chart;
represent the transitions and the user actions that cause the transitions identified in the use information with the edges of the hierarchical message sequence chart; and
for each one of the transitions identified in the use information, link the basic message sequence charts representing the views associated with the transition with the edge representing the transition.

18. The media of claim 17, wherein construct the hierarchical message sequence chart further comprises group the basic message sequence charts into one or more groups at one or more hierarchical levels based on heuristics.

19. The media of claim 17, wherein the software is further operable when executed by the computing devices to:
construct one or more test cases for the software application based on the hierarchical message sequence chart, wherein each one of the test cases comprises a test user action with respect to one of the views of the software application and an expected response to the test user action from the software application; and
automatically test the software application using the test cases, comprising, for each one of the test cases:
simulate the test user action of the test case to the software application to generate an actual response from the software application; and
compare the actual response with the expected response of the test case.

20. The media of claim 17, wherein the software is further operable when executed by the computing devices to display a graphical representation of the hierarchical message sequence chart.

21. The media of claim 17, wherein:
the software application is a web application comprising one or more web pages and each one of the web pages has one or more sets of content;
each one of the views of the software application is one of the sets of content of one of the web pages; and
the transition from the first one of the views to the second one of the views is a transition from a first one of the sets of content of a first one of the web pages to a second one of the sets of content of the first one of the web pages or from the first one of the sets of content of the first one of the web pages to a first one of the sets of content of a second one of the web pages.

22. The media of claim 21, wherein the software is further operable when executed by the computing devices to automatically crawl a website hosting the web application to obtain the use information associated with the web application.

23. The media of claim 22, wherein, when crawling the website hosting the web application, the web application is executed in a first browser.

24. The media of claim 23, wherein the software is further operable when executed by the computing devices to validate the web application with a second browser, comprising:
construct one or more test cases for the web application based on the hierarchical message sequence chart, wherein each one of the test cases comprises a test user action with respect to one of the states of one of the web pages; and
automatically test the web application with the second browser using the test cases, comprising:
apply the test cases to the web application while executing the web application in the second browser; and
compare one or more responses to the test user actions from the web application while executed in the second browser with one or more corresponding responses to the test user actions from the web application while executed in the first browser.

25. A system comprising:
means for accessing use information associated with a user-interactive software application, wherein:
the software application comprises one or more displayable views;
during execution of the software application, a transition from a first one of the views to a second one of the views is caused by a user action with respect to the first one of the views; and
the use information identifies one or more transitions between specific ones of the views and one or more corresponding user actions that cause the transitions; and
means for constructing a hierarchical message sequence chart comprising one or more basic message sequence charts and one or more edges linking specific ones of the basic message sequence charts to represent the use information, comprising:
means for representing the views and the user actions with respect to the views identified in the use information with the basic message sequence charts of the hierarchical message sequence chart;
means for representing the transitions and the user actions that cause the transitions identified in the use information with the edges of the hierarchical message sequence chart; and
for each one of the transitions identified in the use information, means for linking the basic message sequence charts representing the views associated with the transition with the edge representing the transition.

* * * * *